United States Patent Office 3,507,205
Patented Apr. 21, 1970

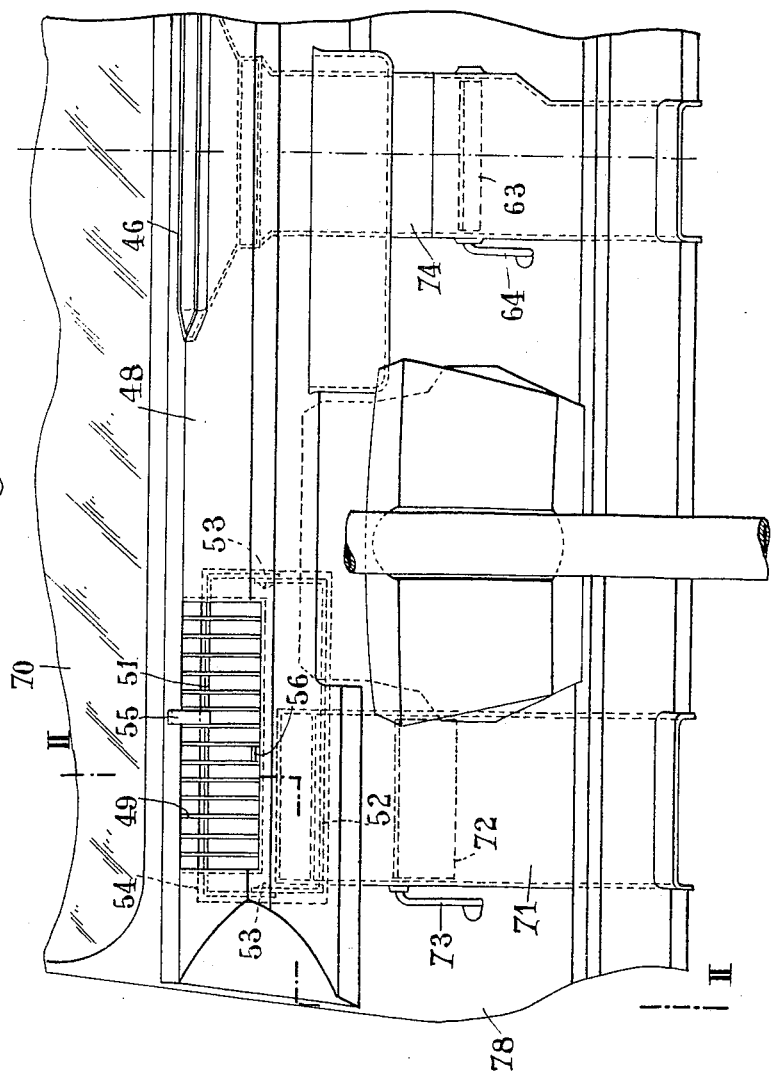

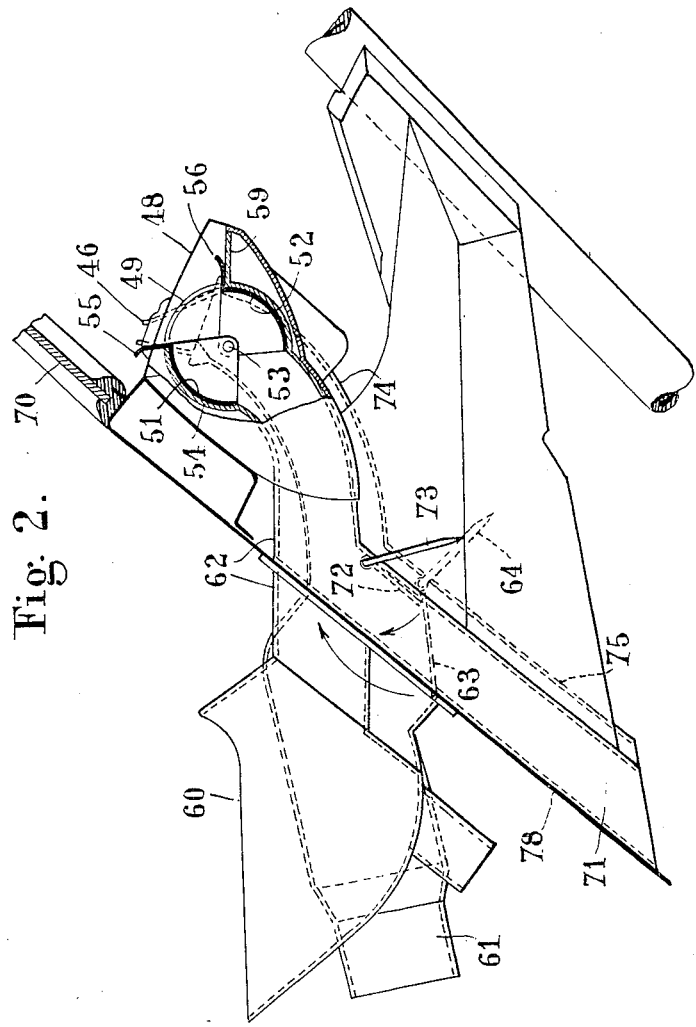

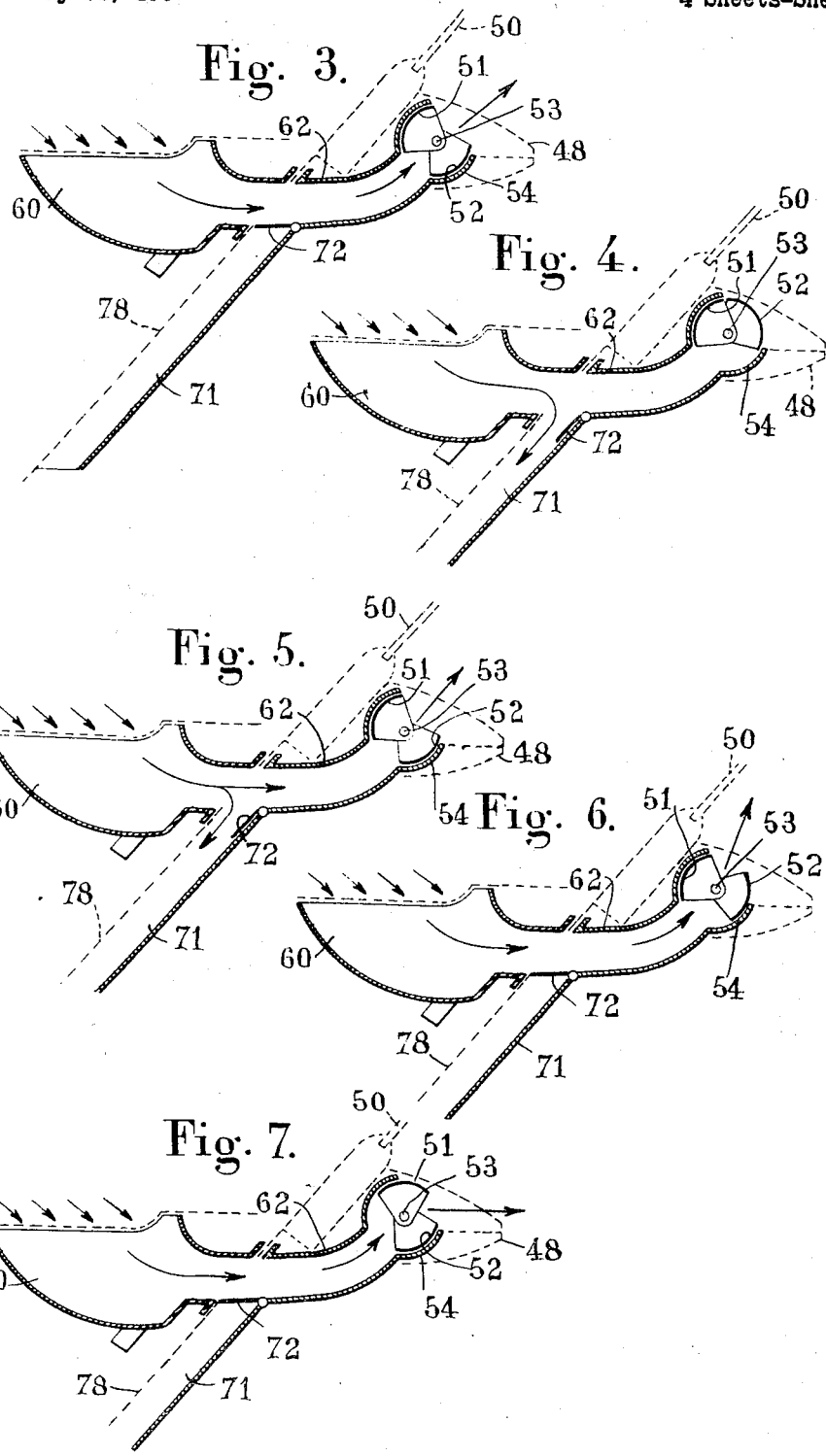

3,507,205
AUTOMOBILE VENT OUTLET
Edmond Henry-Biabaud, Paris, France, assignor to Societe Anonyme Andre Citroen, Paris, France, a French company
Filed May 31, 1967, Ser. No. 642,442
Claims priority, application France, June 17, 1966, 65,900
Int. Cl. B60h 1/28
U.S. Cl. 98—2                                    1 Claim

ABSTRACT OF THE DISCLOSURE

An air-conditioning box mounted in the interior of a vehicle, which comprises at least one pair of ducts respectively for delivering cold air and hot air, and at the end of the hot air duct a nozzle consisting of a cylindrical hollow member slotted longitudinally towards said duct and said interior, and of cylindrical shutters disposed coaxially in said hollow cylindrical member, other shutters adapted to adjust the outputs in said cold air and hot air ducts, control means adjacent to said shutters, and hot air guide means in the vicinity of said cold air nozzles.

BACKGROUND OF THE INVENTION

The present invention relates to an air-conditioning box, notably for automobiles, comprising swivel outlet nozzles disposed for example in the known manner at the ends of the instrument panel and under the windshield and connected through ducts on the one hand to direct air intakes and, on the other hand, to an indirect hot-air circuit, and positively controlled shutters for establishing the desired communications in these ducts according as it is desired to circulate air for heating, de-misting or de-icing purposes.

SUMMARY OF THE INVENTION

This invention is concerned more particularly with various improvements in air-conditioning boxes of this general type, mainly for automotive vehicles.

A first improvement resides in the nozzle for injecting cold air into the vehicle interior, this air injection nozzle having roughly the configuration of a cylinder mounted at either end of the instrument panel, a pair of cylindrical coaxial shutters being pivotally mounted in each cylindrical end and adapted to be controlled separately or jointly by means of levers for adjusting the air output injected into the interior or directing this air in a vertical plane, according to the position of said levers.

Another improvement consists in disposing these control levers sufficiently close to each other to permit their joint or separate operation, at will.

A third improvement consists in disposing the cold air and hot air outlets side by side within the vehicle and providing shutters in each duct whereby said ducts can be inserted in or isolated from the circuit, according to the desired degree and output of the ventilation system.

BRIEF DESCRIPTION OF THE DRAWINGS

In order to afford a clearer understanding of this invention and of the manner in which the same may be carried out in practice, reference will now be made to the accompanying drawing illustrating diagrammatically by way of example a typical form of embodiment of an air-conditioning box mounted in a vehicle.

In the drawing:

FIGURE 1 is an elevational view showing an air-conditioning outlet disposed at one end of the instrument panel;

FIGURE 2 is a section taken along the line II—II of FIGURE 1;

FIGURES 3 to 7 inclusive are diagrams for illustrating the mode of operation of the air-conditioning box;

DESCRIPTION OF THE PREFERRED EMBODIMENTS

Figure 8:
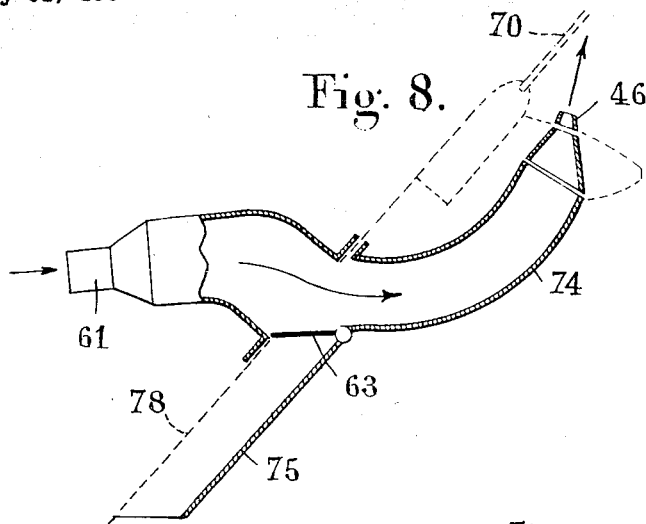
FIGURES 8 to 10 inclusive are similar views showing the operation of the system for heating and de-icing purposes.

Each outlet for injecting air into the vehicle at either end of the instrument panel 48 consists of a cylinder 54 partially open in a diametral portion to constitute on one side a grille 49 and to be connected on the opposite side to the cold air duct 62. Mounted for free rotation in each cylinder are a pair of cylindrical shutters 51 and 52 carried by a common shaft 53 concentric to the axis of cylinder 54. These shutters are positively controlled by means of levers 55 and 56 for assuming any desired relative position.

The outlet cylinder 54 is supported by a member 59 forming an integral part of the instrument panel and disposed beneath the windshield 70.

The duct 62 extends through the dashboard 78 and is divided into two branches or arms 60 leading the former directly to the cold air intake and the latter downwards. A shutter 72 positively controlled by a side lever 73 permits of regulating the communication between ducts 60 and 71.

The aforesaid shutters 51 and 52 permit of closing completely or partially the duct outlet or to direct the air jet at will.

Laterally of this cold air outlet is a single hot air duct 61 leading to an outlet grille 46 disposed preferably in the vertical plane containing the longitudinal center line of the vehicle; this single hot air duct 61 is adapted to be inserted in the circuit leading from the engine, on the one hand, and to the nozzle 74 in front of the dashboard 78, on the other hand. A shutter 63 controlled by means of a lever 64 is provided for opening or closing this hot air intake and its communication with the downwardly directed duct 75.

With this assembly any desired combination for air conditioning the interior of the vehicle with hot air, cold air or at any temperature between hot and cold, as shown more in detail in FIGURES 3 to 10, can be obtained.

FIGURES 3 to 7 inclusive relate more particularly to the supply of fresh air to the interior of the vehicle, that is, the circuit of ducts 60 and 71 adjustable by means of shutters 51 and 52, on the one hand, and shutter 72 on the other hand.

In FIGURE 3, shutter 72 is closed and shutters 51 and 52 are fully open, thus providing the maximum supply of fresh air to the upper portion of the passenger space.

In FIGURE 4, shutter 72 is open and shutter 52 is closed, thus providing the maximum supply of fresh air to the lower portion of the passenger space through duct 71.

In FIGURE 5, shutter 72 is open and shutters 51 and 52 fully open, thus providing the maximum supply of air both to the upper and lower portions of the vehicle interior.

In FIGURE 6, shutter 72 is closed again and shutter 52 partially closed, so that air is directed towards the windshield, for de-misting same for example during damp warm weather.

In FIGURE 7, the shutter 72 is closed, shutter 51 partially closed and shutter 52 fully open, thus giving an upper horizontal air conditioning.

Figure 9:
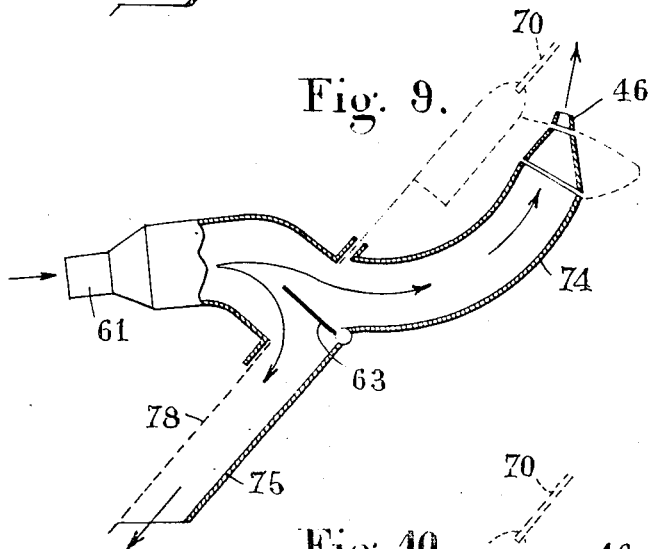
Figure 10:
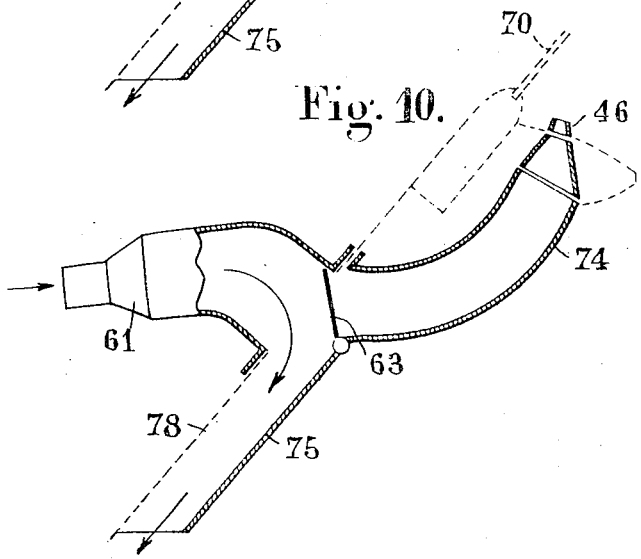

FIGURES 8 to 10 inclusive illustrate the positions giving hot air and de-icing conditions through duct 61; in FIGURE 8 shutter 63 is closed, so that hot air is directed through nozzle 74 towards the windshield for de-icing purposes.

FIGURE 10 illustrates the position giving the maximum heating towards the lower portion of the interior, through duct 75 and by closing shutter 63, and FIGURE 9 shows the position of shutter 63 for heating and de-icing.

Of course, the hot and cold air duct adjustment means may be combined together, and the levers controlling the shutters 51 and 52 of the injection nozzle or outlet, as well as those controlling the shutters 72 and 73 may be disposed within easy reach of the driver to provide any desired air conditioning and de-icing or de-misting conditions.

Although the present invention has been described in conjunction with a preferred embodiment, it is to be understood that modifications may be brought thereto without departing from the spirit and scope of the invention, as those skilled in the art will readily understand. Such modifications are considered to be within the purview and scope of the invention.

What I claim is:

1. A ventilation outlet disposed within the passenger's space of an automotive vehicle, at the end of a duct leading from an aperture for taking outside air, which comprises at the outlet end of said duct a cylindrical box of which the axis and generatrices are disposed transversely to said passenger's space, said box opening into said space through an aperture limited by a lower edge and an upper edge extending along two generatrices respectively, and two shutters having the shape of cylindrical sectors with external diameter near the internal diameter of the cylindrical box, pivotally mounted in said box around the axis of said box, each of said shutters having an outer edge and a radial extension of said outer edge shaped as a lever to actuate the pivoting movement of said shutter to an open position in which its lever is against an edge of the aperture of the box and said shutter is wholly concealed in the box, a fully closed position in which said outer edges of said shutters meet, and partially closed positions to direct air upwardly or downwardly as desired.

References Cited

UNITED STATES PATENTS

| | | | |
|---|---|---|---|
| 2,860,567 | 11/1958 | Wilfert | 98—2 |
| 2,894,441 | 7/1959 | Boylan | 98—2 |
| 2,996,255 | 8/1961 | Boylan | 98—2 XR |
| 3,032,324 | 5/1962 | Fiala | 98—2 XR |
| 3,078,779 | 2/1963 | Wilfert | 98—2 XR |
| 3,315,730 | 4/1967 | Weaver et al. | 165—23 |
| 3,389,649 | 6/1968 | Larkfeld et al. | 98—41 |

FOREIGN PATENTS

| | | |
|---|---|---|
| 728,016 | 4/1955 | Great Britain. |
| 949,595 | 2/1964 | Great Britain. |
| 1,340,573 | 9/1963 | France. |
| 936,434 | 12/1955 | Germany. |

MARK NEWMAN, Primary Examiner

M. A. ANTONAKAS, Assistant Examiner

U.S. Cl. X.R.

98—41; 165—42